E. H. BABCOCK, J. C. WHITING & O. H. CHAMBERLAIN
Plow.

No. 199,398. Patented Jan. 22, 1878.

WITNESSES:

INVENTORS.

UNITED STATES PATENT OFFICE.

ELI H. BABCOCK, JOHN C. WHITING, AND OLIVER H. CHAMBERLAIN, OF CANANDAIGUA, NEW YORK.

IMPROVEMENT IN PLOWS.

Specification forming part of Letters Patent No. 199,398, dated January 22, 1878; application filed November 8, 1877.

*To all whom it may concern:*

Figure 1:
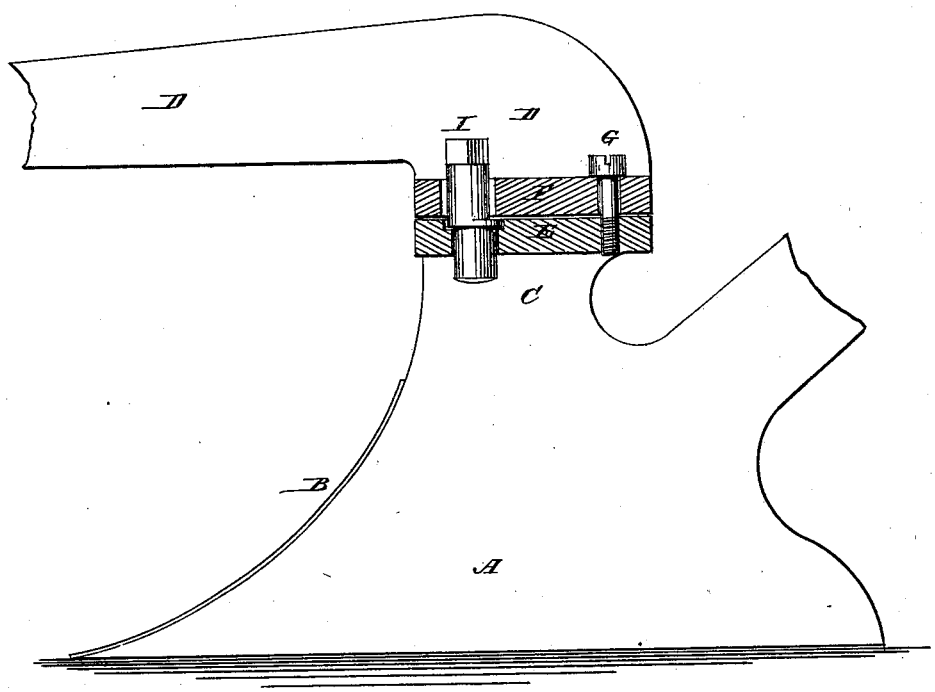
Figure 2:
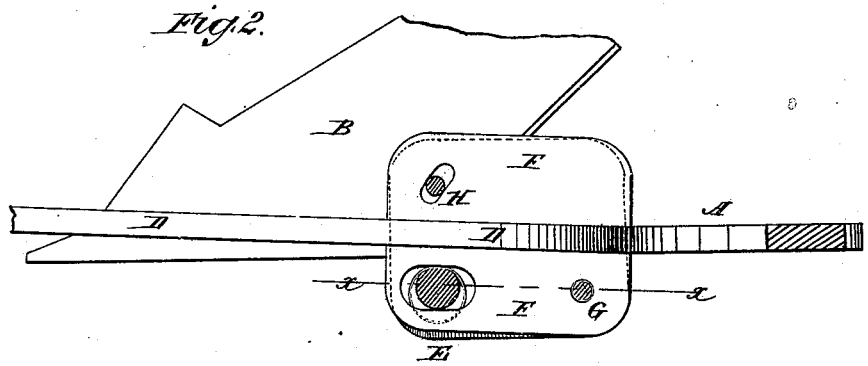

Be it known that we, ELI H. BABCOCK, JOHN C. WHITING, and OLIVER H. CHAMBERLAIN, of Canandaigua, in the county of Ontario and State of New York, have invented a new and useful Improvement in Iron-Beam Plows, of which the following is a specification:

Figure 1 is a side view of our improved plow, partly in section, through the line $x\ x$, Fig. 2, to show the construction. Fig. 2 is a top view of the same, the bolts being shown in section.

Similar letters of reference indicate corresponding parts.

The object of this invention is to improve the construction of that class of iron-beam plows in which the beam extends no farther back than the forward or main standard, so as to enable them to be manufactured more easily and conveniently and at less expense, and so as to enable them to be adjusted to take or leave land, as may be required.

The invention will first be described in connection with the drawing, and then pointed out in the claim.

A is the land-side. B is the mold-board. C is the standard, and D is the beam. Upon the upper end of the standard C is cast a plate or double flange, E, projecting equally upon each side of the said standard. Upon the rear end of the beam D is formed a plate or double flange, F, projecting equally upon both sides of the said beam, and fitting upon the plate E.

G is a bolt which passes through a hole in the rear land-side parts of the plates E and F, and is secured in place by a nut, to serve as a pivot for adjusting the plow. H is a bolt which passes through a slot in the forward mold-board part of the plate F, curved in the arc of a circle having its center in the pivot-bolt G, and through a hole in the forward mold-board part of the plate E, and is secured in place by a nut. I is a pin, having its lower and upper parts eccentric with respect to each other, giving it the form of a short crank. The lower part of the eccentric-pin I enters a hole in the forward land-side part of the plate E, and has a flange around its upper end, which enters a rabbet or countersink in the upper side of the said plate E. The upper part of the eccentric-pin I passes through a short longitudinal slot in the forward land-side part of the plate F, and has its upper end squared off to receive a wrench for turning it.

By this construction, by loosening the nut of the bolt H and turning the eccentric-pin I, the plow-beam D may be adjusted to take or leave land, as may be required. This construction enables the plow to be adjusted for use as a two-horse plow or as a three-horse plow, as may be desired. By this construction, also, the draft will always be in line with the plow-beam, so that there will be no danger of breaking the said beam.

Having thus described our invention, we claim as new and desire to secure by Letters Patent—

The combination of the plow-beam D, having the slotted plate F, with the standard C, provided with plate E, pivot-bolt G, clamping-bolt H, and eccentric-pin I, substantially as herein shown and described.

ELI HENRY BABCOCK.
JOHN CHESTER WHITING.
OLIVER HOWARD CHAMBERLAIN.

Witnesses:
N. J. MILLIKEN,
CHARLES F. MILLIKEN.